(12) United States Patent
Lisso (10) Patent No.: US 11,273,985 B2
(45) Date of Patent: Mar. 15, 2022

(54) ORDER-PROCESSING WORK CELLS

(71) Applicant: Target Brands, Inc., Minneapolis, MN (US)

(72) Inventor: Gregory Lisso, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 272 days.

(21) Appl. No.: 16/657,344

(22) Filed: Oct. 18, 2019

(65) Prior Publication Data
US 2020/0231385 A1 Jul. 23, 2020

Related U.S. Application Data (60) Provisional application No. 62/793,719, filed on Jan. 17, 2019.

(51) Int. Cl.
*B65G 1/137* (2006.01)
*G06Q 30/06* (2012.01)

(52) U.S. Cl.
CPC ......... *B65G 1/1378* (2013.01); *B65G 1/1376* (2013.01); *G06Q 30/0635* (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0101627 A1* | 4/2012 | Lert | ........................ | B65G 1/065 |
| | | | | 700/216 |
| 2014/0178161 A1* | 6/2014 | Moosburger | ......... | B65G 1/1378 |
| | | | | 414/273 |
| 2014/0244026 A1* | 8/2014 | Neiser | .................. | B65G 1/1378 |
| | | | | 700/216 |
| 2019/0359424 A1* | 11/2019 | Avraham | ............... | B25J 9/1689 |

OTHER PUBLICATIONS

Andriansyah et al., "On sustainable operation of warehouse order picking systems," Eindhoven University of Technology, Jan. 2009, 8 pages.
Dematic.com [online] "GTP solution lifts order picking productivity, accuracy and safety," available on or before Jul. 30, 2018, via Internet Archive: Wayback Machine URL <https://web.archive.org/web/20181001110906/https://www.dematic.com/en-au/news-and-downloads/literature/case-studies/featured-case-studies/blackwoods/>, 17 pages.
Uploaded by Tim Kurka, [online] "Trilogiq," uploaded on Nov. 21, 2010, retrieved on Oct. 18, 2019, retrieved from URL <https://www.youtube.com/watch?v=SweYYNF8uxM>, [video submission].

* cited by examiner

*Primary Examiner* — Kyle O Logan
(74) *Attorney, Agent, or Firm* — Fish & Richardson P.C.

(57) ABSTRACT

Systems and methods of controlling material flow can be used to streamline order fulfillment. For example, according to some embodiments described herein, takt times of goods-to-person order picking work cell processes are enhanced to expedite order processing. A goods-to-person order picking process involves moving items for an order directly to a work cell of an operator or an automated system. At order processing work cells, one or more items are transferred from origin containers and placed in shipping containers in accordance with customer orders. Work cell redundancy can be utilized to enhance efficiencies of goods-to-person order picking processes in some cases.

9 Claims, 5 Drawing Sheets

ORDER-PROCESSING WORK CELLS

CROSS-REFERENCE TO RELATED APPLICATIONS

This application claims the benefit of U.S. Provisional Application Ser. No. 62/793,719, filed Jan. 17, 2019. The disclosure of the prior application is considered part of (and is incorporated by reference in) the disclosure of this application.

TECHNICAL FIELD

This document relates to systems and methods for enhancing efficiencies of order fulfillment processes. For example, this document relates to systems and methods for optimizing the takt times of goods-to-person order picking work cell processes to expedite order processing.

BACKGROUND

Customers expect their orders to be fulfilled properly and promptly on a consistent basis. Second-day deliveries are now essentially an ordinary expectation, and same-day or next-day deliveries are becoming more standard. Highly efficient warehousing, order processing, and shipping processes are required to meet these increasingly higher levels of customer expectations.

The order fulfillment process refers to all the steps companies take from when they receive a customer order (which can include an order that is wholly or partly internal to the company, such as a store replenishment order) until the items are landed in customers' hands. Such steps can include, for example: the order is sent to the warehouse; a worker goes into the warehouse, finds the items in the order, and picks the items off the shelf; the order is packed for shipping; the order is shipped. Order processing involves picking (e.g., retrieval of items from where they are stored), and packing (e.g., getting the order ready to ship).

The use of order processing optimization is one way to increase the efficiency of an order fulfillment process. The goal of order processing optimization is to cut out inefficiencies of the order fulfillment process.

SUMMARY

This document describes systems and methods for enhancing efficiencies of order fulfillment processes. For example, this document describes systems and methods for optimizing the takt times of goods-to-person order picking work cell processes to expedite order processing. In the context of this disclosure, "takt time" refers to a work cell's average time between the start of the re-binning process for one order to the start of the re-binning process for the next order.

In one aspect, this disclosure is directed to an order processing work cell system. In some embodiments, the order processing work cell system includes a first workstation having locations for staging two or more first origin containers and one or more first destination containers, and a second workstation having locations for staging two or more second origin containers and one or more second destination containers. The first workstation is near to the second workstation such that a single operator can operate both the first workstation and the second workstation.

Such an order processing work cell system may optionally include one or more of the following features. The single operator may be a picking robot. The system may also include the picking robot. The system may also include one or more conveyor systems that move the two or more first origin containers into and out of the locations of the first workstation. The system may also include one or more mobile robots that move the two or more first origin containers into and out of the locations of the first workstation. The first workstation and the second workstation may be configured equivalently to each other. The first workstation and the second workstation may be configured differently from each other. The single operator may comprise a tele-operated picking system. The system may also include the tele-operated picking system. The two or more first origin containers may include five or more first origin containers. The one or more first destination containers may include two or more first destination containers.

In another aspect, this disclosure is directed to order processing method. In some embodiments, the order processing method includes: (i) conveying, to a first workstation of an order processing work cell, two or more first origin containers, the two or more first origin containers carrying sellable items called for by a first customer order; (ii) conveying, to the first workstation of the order processing work cell, a first destination container; (iii) transferring one or more of the sellable items from the two or more first origin containers to the first destination container in accordance with the first customer order; (iv) conveying, to a second workstation of the order processing work cell, two or more second origin containers, the two or more second origin containers carrying sellable items called for by a second customer order, wherein the first workstation is near to the second workstation such that a single operator can operate both the first workstation and the second workstation; (v) conveying, to the second workstation of the order processing work cell, a second destination container; and (vi) transferring one or more of the sellable items from the two or more second origin containers to the second destination container in accordance with the second customer order.

Such an order processing method may optionally include one or more of the following features. The single operator may perform both of the transferring steps of the method. The conveying steps of the method may be performed by one or more mobile robots. The conveying steps of the method may be performed by one or more conveyors. The transferring steps may be performed by the single operator and the single operator is a human worker. The transferring steps may be performed by the single operator and the single operator is a picking robot. The two or more second origin containers and the second destination container may all be conveyed to the second workstation during the transferring the one or more of the sellable items from the two or more first origin containers to the first destination container in accordance with the first customer order. In some embodiments: (i) after the transferring the one or more of the sellable items from the two or more first origin containers to the first destination container in accordance with the first customer order, and (ii) during the transferring the one or more of the sellable items from the two or more second origin containers to the second destination container in accordance with the second customer order, the two or more first origin containers and the first destination container may be all conveyed away from the first workstation. The method may also include: after conveying the two or more first origin containers and the first destination container away from the first workstation, and during the transferring the one or more of the sellable items from the two or more second origin containers to the second destination container in accordance with the second customer order, conveying to the first workstation, two or more third origin containers. The two or more third origin containers may carry sellable items called for by a third customer order. The method may also include, during the conveying the two or more third origin containers, also conveying a third destination container to the first workstation. The method may also include, after the transferring the one or more of the sellable items from the two or more second origin containers to the second destination container in accordance with the second customer order, transferring one or more of the sellable items called for by the third customer order from the two or more third origin containers to the third destination container.

The systems and processes described here may be used to provide one or more of the following optional benefits. First, some embodiments provide an order fulfillment process that is more efficient, responsive, and agile so orders can be shipped to internal and external customers in a shorter timeframe than some current processes. Such a result can be accomplished, for example, through optimizing material flow by reducing delays and interferences. Second, some embodiments allow inventory-carrying costs to be reduced by the added efficiencies provided by the systems and processes described herein. Third, some embodiments of the systems and methods described herein are readily scalable to respond efficiently to increasing or decreasing order processing demands. Fourth, in some embodiments the ergonomics associated with order processing can be enhanced using the systems and processes described herein. Fifth, in some embodiments the labor costs associated with the order fulfillment processes can be reduced using the systems and processes described herein. Sixth, in some embodiments floor space requirements for order processing can be reduced using the systems and processes described herein.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing efficiencies of order fulfillment processes. For example, this document describes systems and methods for optimizing the takt times of goods-to-person order picking work cell processes to expedite order processing. In some implementations, order processing steps include, for example, picking (e.g., retrieval of items from storage), re-binning (e.g., transferring the items from storage to a shipping container), and other associated tasks to get the items of an order ready to ship (e.g., labeling, packaging, transacting, etc.). A goods-to-person order picking process involves moving items for an order directly to a work cell of an operator (e.g., order picker person) or an automated system (e.g., a robotic order-picking system).

Figure 1:
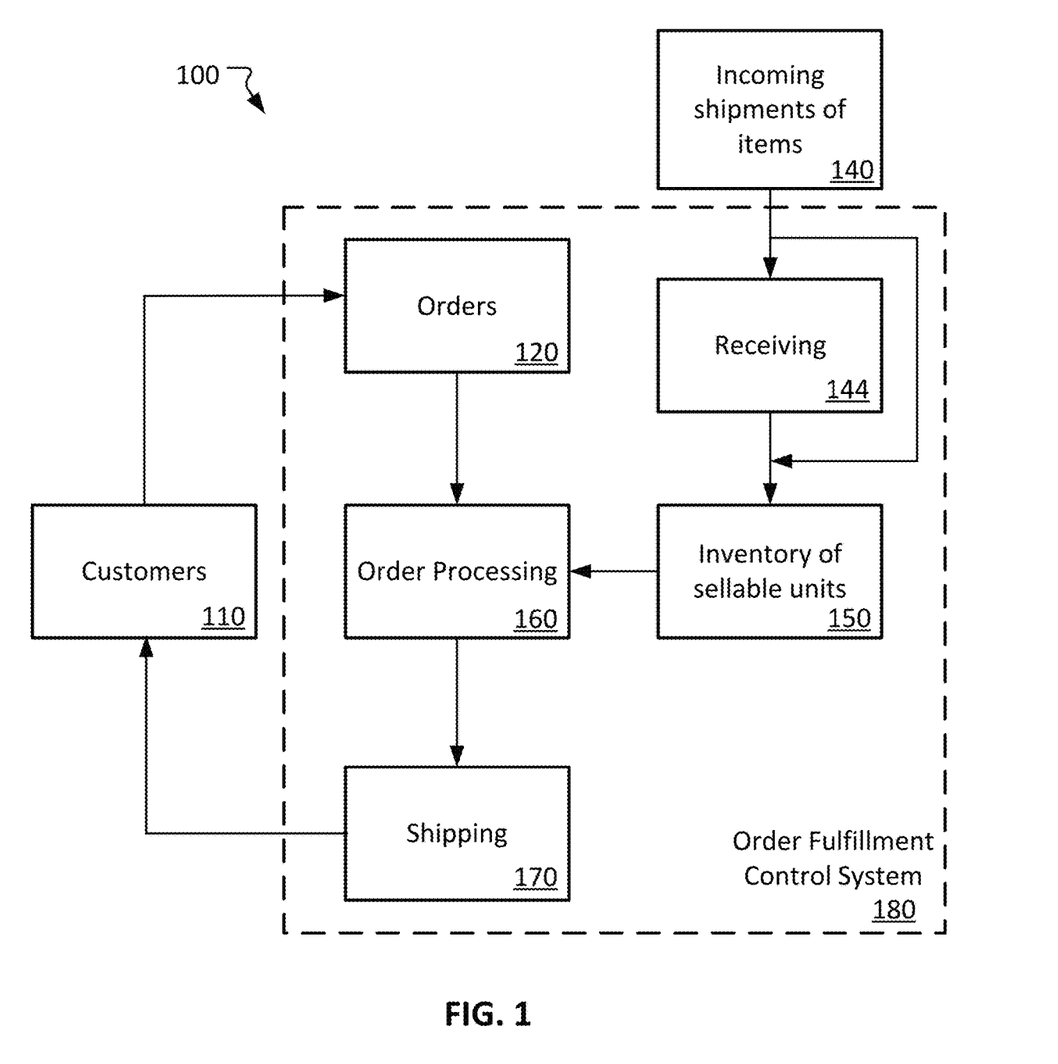
FIG. 1 is a highly simplified schematic diagram of a basic order fulfillment process.

FIG. 1 is a schematic diagram illustrating an example order fulfillment process 100. The order fulfillment process 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "flow center" may be used to refer to any and all such different types of facilities, and combinations thereof. In some examples, the order fulfillment process 100 takes place at a single facility. Alternatively, in some examples execution of the order fulfillment process 100 is distributed across two or more facilities. A flow center as described herein can be a portion of a multi-echelon supply chain.

The flow of sellable items within the overall order fulfillment process 100 is driven by demand for those sellable items from customers 110. In this disclosure, the term "customers" will be used to broadly refer to a variety of different entities such as, but not limited to, individual consumers, retail stores (e.g., for stock replenishment), business partners, other flow centers, and the like.

Tangible orders 120 result from the demand for sellable items from the customers 110. An individual order 120 may be for one unit of a single sellable item, for multiple units of a single sellable item, for two or more different types of sellable items, for a case quantity, for a pallet load, and the like, and any and all possible permutations thereof. Whatever the order 120 includes, the goal of the order fulfillment process 100 is to ship (preferably in a single shipment) all of the sellable items included in the orders 120 in a timely and accurate manner. However, the scope of the order fulfillment process 100 also includes partial shipments that do not include all of the items included in an order 120.

The orders 120 are entered into an order fulfillment control system 180 (represented in FIG. 1 by the dashed-line boundary). In some examples, the order fulfillment control system 180 may be part of and/or may comprise a business management system such as, but not limited to, an enterprise resource planning (ERP) system, a materials management system, an inventory management system, a warehouse management system, one or more automation control systems, and the like, and combinations thereof. Accordingly, the order fulfillment control system 180 (or simply "control system 180") can, in some cases, broadly encompass multiple systems that can be situated locally, remotely, or situated both locally and remotely. The control system 180 can include hardware, software, user-interfaces, and so on. For example, the control system 180 may include one or more computer systems, data storage devices, wired and/or wireless networks, control system software (e.g., programs, modules, drivers, etc.), user interfaces, scanners, communication modules, interfaces for control communications with robots, and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., cases and totes) and communicate with a control station or stations of the control system 180. The scanners may also be able to scan, receive, or otherwise detect the marks or tags (e.g., bar codes, RFID tags, etc.) attached to or integrated with conveyance receptacles such as inventory totes and boxes.

Still referring to FIG. 1, incoming shipments of items 140 arrive at the flow center. In some cases, the incoming shipments of items 140 are processed by receiving 144 (e.g., the performance of inspections, quantity confirmations/reconciliations, inventory/order control system transactions, etc.). Afterwards, the items enter into inventory 150 of the flow center as sellable units. In some cases, some incoming items go directly from receiving 144 into inventory 150 (e.g., if the incoming items were transferred in from an affiliated facility at which the items were already in the inventory system). The types and quantities of the incoming items 140 may be controlled to keep a desired stock level of the sellable units in the inventory 150 of the flow center. In some cases, the types and quantities of the incoming items 140 may be the result of a proactive inventory transfer (e.g., "pushing" inventory), a reactive inventory transfer (e.g., "pulling" inventory), and/or other such inventory management techniques.

The sellable units in inventory 150 can be located in various types of storage accommodations such as racks, shelves, containers, vessels, carts, bins, totes, pallet lanes, and the like. Such storage accommodations can be individually identified and tracked by the control system 180. That is, the control system 180 can be used to keep track of the quantities in stock of the various sellable items in the inventory 150 and of the inventory location(s) of the various sellable items in the inventory 150. The sellable items in the inventory 150 can be stored in various receptacles such as, but not limited to, boxes, totes, pallets, baskets, bins, bags, and the like.

Next, in the step of order processing 160, the sellable item(s) included in the customer order 120 are compiled in preparation for shipment to the respective customer 110. To fulfill the customer orders 120, the one or more items specified in each order may be retrieved, or picked, from inventory 150. As described further below in reference to FIG. 2, the sellable items pertaining to the individual customer orders 120 may be delivered or conveyed to one or more areas in the flow center for sorting and assembling into one or more outbound shipping containers for the fulfillment of the respective customer orders 120. Outbound shipping containers containing the ordered sellable items are then transported to customers 110 at the step of shipping 170.

Order fulfillment process 100 includes the daily replenishment and movement of inventory generated from real-time demand singles for in-store retail sales and direct-to-guest on-line sales fulfilled from a multi-echelon inventory-holding model at the correct unit of measure, using fast and easy material handling equipment that will create operational efficiency at every process step in the supply chain.

FIG. 1 and the foregoing description of the order fulfillment process 100 has provided a high-level overview of the operations of a flow center. Next, in reference to FIGS. 2-5, a much more detailed description focused particularly on the step of order processing 160 will be provided.

FIGS. 2-5 are a series of figures depicting a sequence of example operations of a redundant goods-to-person order picking work cell 200 (or simply "work cell 200").

Figure 2:
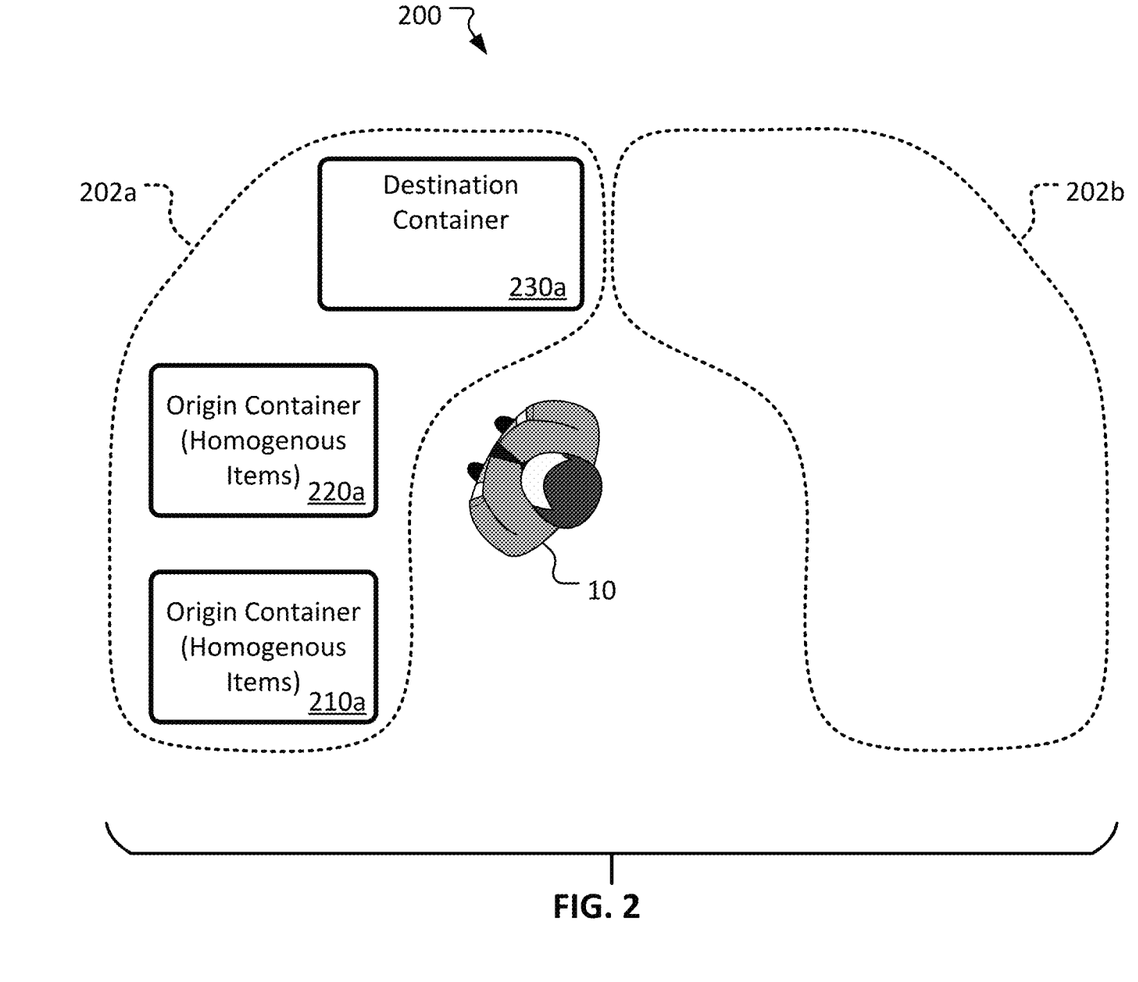
FIG. 2 is a depiction of an example goods-to-person order picking work cell in accordance with some embodiments. The work cell is in a first configuration.

Referring to FIG. 2, the work cell 200 can be used for order processing (such the step of order processing 160 described above in reference to FIG. 1). That is, the work cell 200 can be used for order processing operations such as item picking (e.g., retrieval of items from storage locations/containers), re-binning (e.g., transferring the items to a shipping container), and other associated tasks involved in getting the items of an order prepared for shipment (e.g., labeling, packaging, transacting, etc.).

In the depicted example, the work cell 200 includes a first workstation 202a and a second workstation 202b. In some embodiments, the first workstation 202a and the second workstation 202b are essentially equivalent or duplicative regarding aspects such as layout, equipment, and/or functionality as a whole. Hence, the depicted work cell 200 can be considered to be a redundant or duplicative goods-to-person order processing work cell. However, such equivalency between the first workstation 202a and the second workstation 202b is not required in all embodiments of the order-processing work cells described herein. That is, in some cases the work cell 200 includes one or more differences between the first workstation 202a and the second workstation 202b. Such differences between the first workstation 202a and the second workstation 202b can include, but are not limited to, space/capacity, layout, functionality, automation, and the like. While the depicted embodiment of work cell 200 includes two workstations 202a and 202b, some embodiments can include three, four, five, six, or more than six workstations that can be operated separately as distinct workstations while being located in near proximity to each other. In some embodiments, two or more of the distinct workstations can be at times combined with each other and operated as a larger single workstation. In that manner, the work cell 200 is flexible and reconfigurable into various optimal workstation arrangements in response to often-changing requirements of the order processing operations.

It can be recognized that since the work cell 200 includes the redundant or duplicative workstations 202a and 202b, order processing can be performed with minimal takt time. That is, as described further below, the redundancy of the duplicative workstations 202a and 202b can be leveraged to reduce the time between the start of processing a first order to the start of processing a next order. Said differently, the downtime or changeover time between processing sequential orders can be minimized using the duplicative workstations 202a and 202b of the work cell 200. Accordingly, order processing can be advantageously performed at a high rate of speed, and with high utilization of resources.

FIG. 2 depicts the work cell 200 in a first configuration. In this first configuration, a human operator 10 is processing a first order using the first workstation 202a. Meanwhile, the second workstation 202b is going through a changeover process in preparation for processing the next order.

While the human operator 10 is depicted as the primary means by which items are handled/transferred as part of the operations of the work cell 200, other means can be used as an alternative to, or in addition to, the human operator 10. For example, in some embodiments a picking robot can be used instead of the human operator 10. In some cases, cameras and/or vision systems are employed to enhance the accuracy and speed of the picking robot. In some embodiments, other types of automated or semi-automated equipment can be used instead of, or in conjunction with, the use of the human operator 10. In another example, in some embodiments the operations of the work cell 200 can be performed partially or fully using a tele-operated picking system (e.g., where a human operates one or more picking machines/processes remotely).

In the depicted example, the workstations 202a and 202b can each include three containers (e.g., a first origin container 210a, a second origin container 220a, and a destination container 230a). One or more items from each of the origin containers 210a and 220a will be picked therefrom and transferred to the destination container 230a in accordance with a customer order. While in the depicted example two origin containers 210*a* and 220*a* are shown for simplicity, it should be understood that the work cell 200 can be scaled to facilitate the usage of any practical number of origin containers such as, three, four, five, six, seven, eight, nine, ten, eleven, twelve, thirteen, fourteen, fifteen, sixteen, seventeen, eighteen, nineteen, twenty, and more than twenty origin containers, without limitation. In some embodiments, the origin containers can be staged within the workstations 202*a* and/or 202*b* in multiple levels or elevations to make multiple origin containers readily accessible at the workstations 202*a* and/or 202*b* while minimizing the floor space required. Moreover, in some embodiments, two or more destination containers 230*a* can be utilized in a single workstation 202*a* and/or 202*b*.

The containers (e.g., the origin containers 210*a*/220*a* and the destination container 230*a*) can be any suitable type of item storage unit. For example, the containers can be any type of storage unit such as, but not limited to, totes, boxes, cases, cartons, carts, bins, pallets, racks, shelves, containers of other types, and the like, and combinations thereof. In some embodiments, the origin containers 210*a*/220*a* and/or the destination container 230*a* can be different types of storage units. Any combination of differing types of storage units are encompassed within the scope of this disclosure.

In some examples, the origin containers 210*a*/220*a* is/are used to hold multiple sellable items that have been decanted from a vendor's original full case packaging. In other cases, the origin containers 210*a*/220*a* can be used to hold one or more original full case packages of a vendor (each full case package holding a quantity of one or more sellable items), and orders for full cases of one or more items can thereby be fulfilled. In other cases, a vendor's package can be directly used as the origin containers 210*a*/220*b*. While in some cases the origin containers 210*a*/220*a* are homogenous (containing a single type of item), in some cases the origin containers 210*a* and/or 220*a* can have two or more different types of items in the container.

Again, as the human operator 10 is processing the first order using the first workstation 202*a*, the second workstation 202*b* can be going through a changeover process in preparation for processing the next order.

Figure 3:
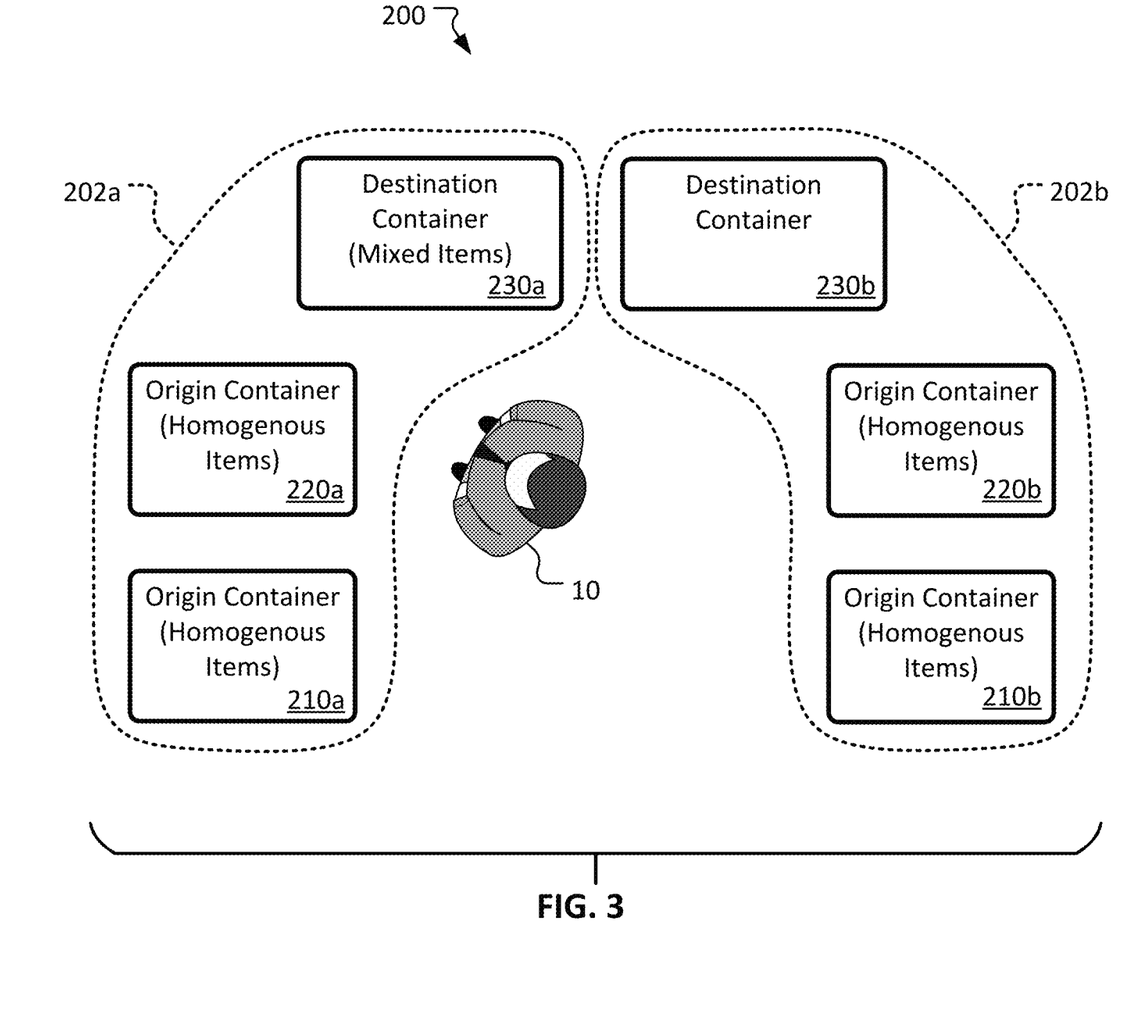
FIG. 3 shows the work cell of FIG. 2 in a second configuration.

Referring now to FIG. 3, the work cell 200 can also be configured in a second configuration as shown. In this configuration, the operator 10 is still working on processing the first order using the first workstation 202*a*, and meanwhile the second workstation 202*b* has been populated/staged with the necessary materials for a second or subsequent order to be processed by the operator 10. Accordingly, as soon as the operator 10 is completed processing the first order at the first workstation 202*a*, he/she can begin using the second workstation 202*b* to process the second order.

Because the second workstation 202*b* is staged and awaiting processing while the operator 10 finishes up processing the first order using the first workstation 202*a*, the downtime of the operator 10 for changeovers between orders while processing a series of orders using the work cell 200 is essentially eliminated (as compared to a work cell that has a single workstation). Said another way, the takt time, or the work cell's average time between the start of the re-binning process for one order to the start of the re-binning process for the next order, is minimized or essentially eliminated. Moreover, as depicted, the workstations 202*a* and 202*b* can be in close proximity to each other to minimize or eliminate any travel time for the operator 10 to move between the workstations 202*a* and 202*b*.

A comparison of FIGS. 2 and 3, reveals that, while the second workstation 202*b* was empty of containers in the configuration of FIG. 2, in FIG. 3 the second workstation 202*b* is populated with a first origin container 210*b*, a second origin container 220*b*, and a destination container 230*b*. Those containers 210*b*/220*b*/230*b* can be transferred to the second workstation 202*b* in any suitable manner and using any suitable material handling equipment/technique. For example, in some cases the movements to and from the work cell 200 of the containers 210*b*/220*b*/230*b* (and all other containers described herein) can be facilitated by material handling equipment/techniques such as, but not limited to, mobile robots, conveyors, automated guide vehicles (AGVs), autonomous order picker systems, and the like, and combinations thereof. In some cases, the container movements can be performed by other types of autonomous devices/systems. In some cases, the container movements can be performed manually by one or more workers operating a fork truck, pallet jack, cart, dolly, and the like.

In some embodiments, while the work cell 200 is configured as shown, items from one or more of the origin containers 210*b* and/or 220*b* of the second workstation 202*b* can be picked and transferred to the destination container 230*a* of the first workstation 202*a*. Alternatively, items from one or more of the origin containers 210*a* and/or 220*a* of the first workstation 202*a* can be picked and transferred to the destination container 230*b* of the second workstation 202*b*. In other words, the operator 10 can work across both of the workstations 202*a* and 202*b* if and when that is an efficient manner of utilizing the overall resources of the work cell 200. It should be understood that the work cell 200 is very flexible in that it can be used in a variety of different ways in order to increase operational efficiencies.

Figure 4:
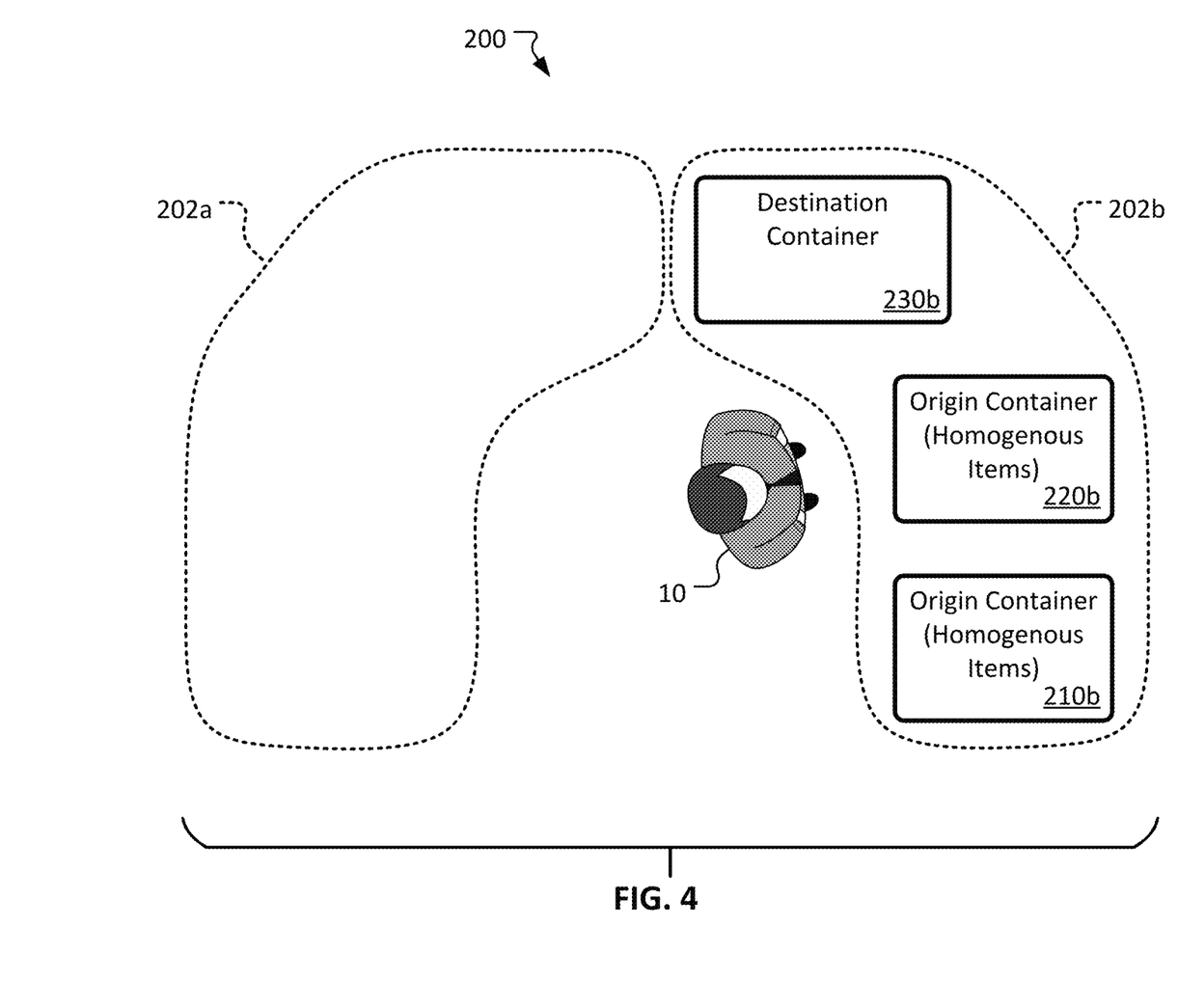
FIG. 4 shows the work cell of FIG. 2 in a third configuration.

Referring to FIG. 4, a third configuration of the work cell 200 is depicted. In this example configuration, the operator 10 has completed processing the first order using the first workstation 202*a* and has begun working on processing a second order using the second workstation 202*b*. In addition, the origin containers 210*a*/220*a* and the destination container 230*a* that were used in the first workstation 202*a* (FIG. 3) for the first order have now been moved out of the first workstation 202*a*. The destination container 230*a* will typically be moved to a shipping area in preparation for shipment. The origin containers 210*a*/220*a* will typically be moved back to a storage or staging area (or to a replenishment area in some cases).

Figure 5:
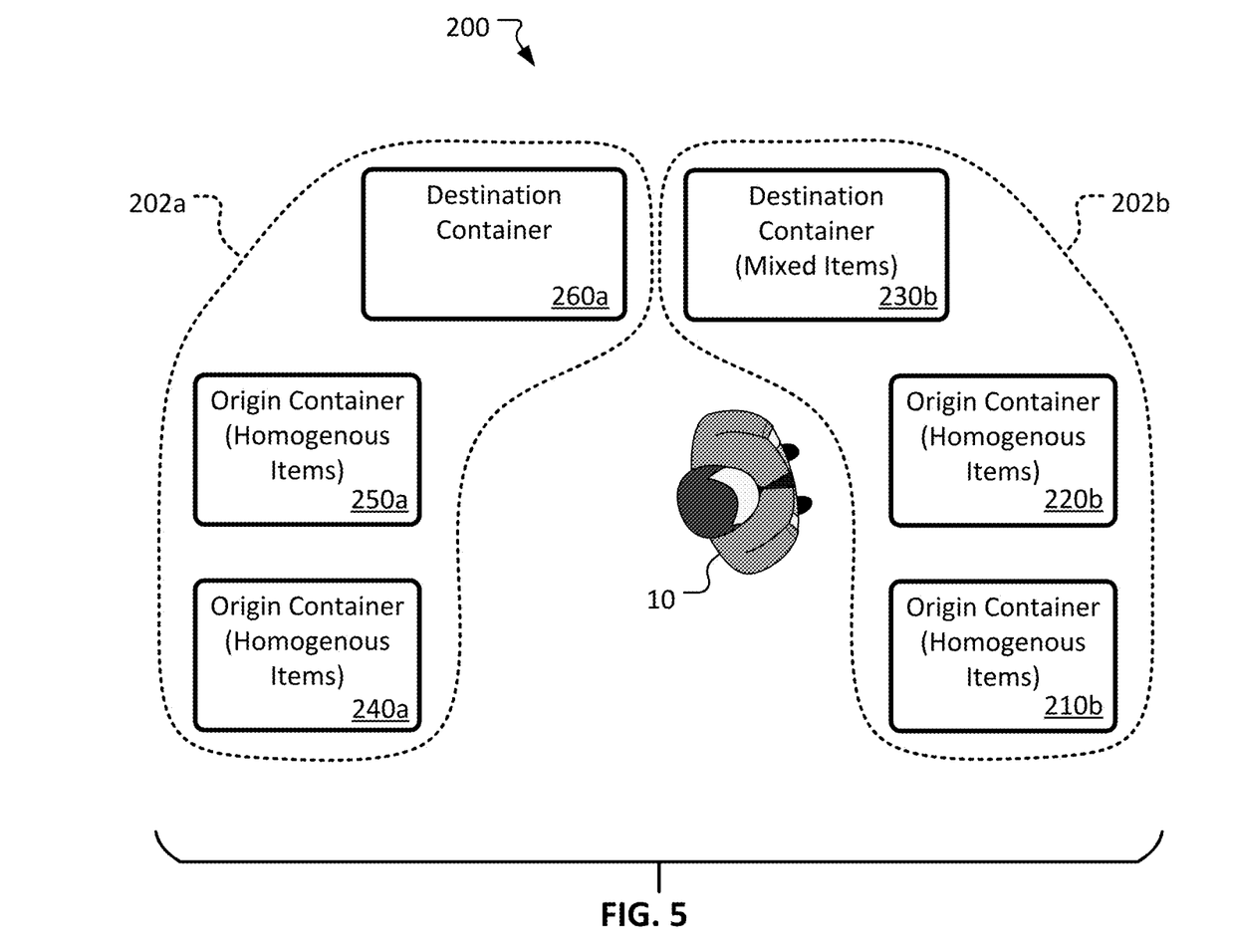
FIG. 5 shows the work cell of FIG. 2 in a fourth configuration.

Referring to FIG. 5, a fourth configuration of the work cell 200 is depicted. In this example configuration, the operator 10 is still working on processing the second order at the second workstation 202*b*. Meanwhile, the first workstation 202*a* has been populated with a first origin container 240*a*, a second origin container 250*a*, and a destination container 260*a*. Accordingly, the first workstation 202*a* is staged with the needed materials for the operator 10 to shift over to the first workstation 202*a* as soon as he/she is done processing the second order at the second workstation 202*b*. In this fashion, it can again be envisioned that operator downtime for changeovers between orders while processing a series of orders using the work cell 200 is essentially eliminated.

In some situations, while the operator 10 is processing the order at workstation 202*b*, the operator 10 can pick items from one or more of the origin containers 240*a* and/or 250*a* that are staged in the first workstation 202*a*. In such a fashion, the operator 10 can work across both of the workstations 202*a* and 202*b* whenever doing so is an efficient way of utilizing the overall resources of the work cell 200.

When the operator 10 is finished processing the second order using the second workstation 202*b*, he/she can shift back over to the first workstation 202*a* to begin processing a third customer order using the first origin container 240*a*, the second origin container 250*a*, and the destination container 260*a*. In addition, when the processing of the second order using the second workstation 202*b* has been completed, the containers 210*b*/220*b*/230*b* can be transferred out of the second workstation 202*b* to the appropriate locations. When those transfers have taken place, the work cell 200 will be back in the configuration shown in FIG. 2 (except most likely with one or more different containers in the first workstation 202*a*). From there, the cycle of processing sequential customer orders using the work cell 200 as depicted by FIGS. 2-5 (and as described above) can be repeated, over and over again.

It should be understood that the redundant or duplicative goods-to-person order processing work cell 200 allows multiple types of orders to be processed and fulfilled using the same (or essentially the same) work cell 200 and process. For example, direct-to-customer shipments, store replenishment orders, customer pick-up-at-store orders, forward deployment of inventory shipments, inventory transfers (e.g., proactive inventory transfers, reactive inventory transfers), and the like can be processed and fulfilled using essentially the same order processing work cell 200. Hence, the order processing work cell 200 can be part of an omni-channel order processing operation.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. An order processing method, comprising:
  conveying, to a first workstation of an order processing work cell, two or more first origin containers, the two or more first origin containers carrying sellable items called for by a first customer order;
  conveying, to the first workstation of the order processing work cell, a first destination container;

transferring, by a single human worker, one or more of the sellable items from the two or more first origin containers to the first destination container in accordance with the first customer order;

conveying, to a second workstation of the order processing work cell, two or more second origin containers, the two or more second origin containers carrying sellable items called for by a second customer order, wherein the first workstation is near to the second workstation such that the single human worker can operate both the first workstation and the second workstation;

conveying, to the second workstation of the order processing work cell, a second destination container;

after the transferring of the one or more of the sellable items from the two or more first origin containers to the first destination container, moving, by the single human worker, from the first workstation to the second workstation;

after the moving of the single human worker from the first workstation to the second workstation, transferring, by the single human worker, one or more of the sellable items from the two or more second origin containers to the second destination container in accordance with the second customer order;

during the transferring of the one or more of the sellable items from the two or more second origin containers to the second destination container, conveying the two or more first origin containers and the first destination container away from the first workstation;

after the conveying of the two or more first origin containers and the first destination container away from the first workstation and during the transferring of the one or more of the sellable items from the two or more second origin containers to the second destination container, conveying to the first workstation, a third destination container and two or more third origin containers, the two or more third origin containers carrying sellable items called for by a third customer order;

after the transferring of the one or more of the sellable items from the two or more second origin containers to the second destination container, moving, by the single human worker, from the second workstation to the first workstation; and after the moving of the single human worker from the second workstation to the first workstation, transferring, by the single human worker, one or more of the sellable items from the two or more third origin containers to the third destination container in accordance with the third customer order.

2. The method of claim 1, wherein the conveying steps of the method are performed by one or more mobile robots.

3. The method of claim 1, wherein the conveying steps of the method are performed by one or more conveyors.

4. The method of claim 1, wherein the two or more first origin containers are staged in multiple elevations in the first workstation.

5. The method of claim 1, wherein the two or more second origin containers are staged in multiple elevations in the second workstation.

6. The method of claim 1, wherein the two or more first origin containers and the first destination container are differing types of storage units.

7. The method of claim 1, wherein the two or more second origin containers and the second destination container are differing types of storage units.

8. The method of claim 1, wherein each of the two or more first origin containers carries only a single type of sellable item.

9. The method of claim 1, wherein at least one of the two or more first origin containers carries multiple types of sellable items.

* * * * *